March 21, 1961 A. WITTLIN 2,976,124
FLUID INDICATOR
Filed June 2, 1958
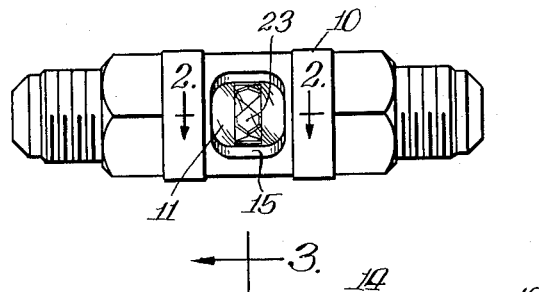
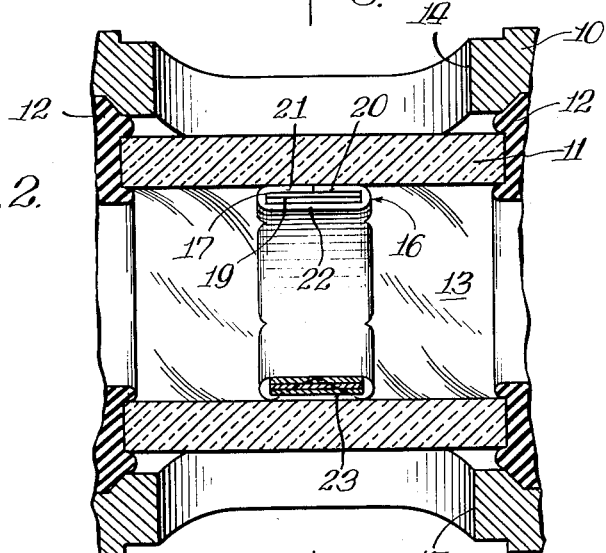
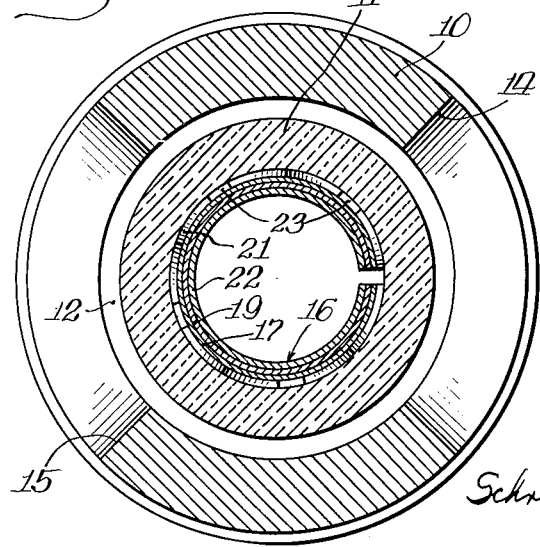
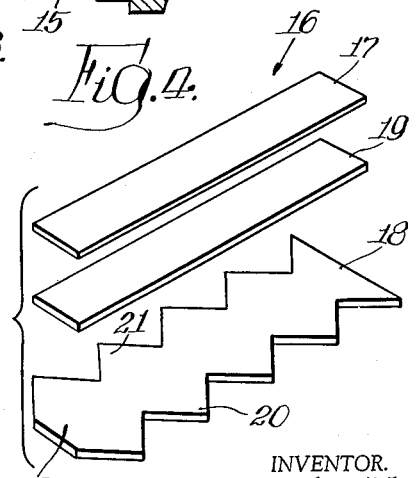
INVENTOR.
Albert Wittlin
BY
Schroeder, Hofgren, Brady & Wegner
Attys.

United States Patent Office 2,976,124
Patented Mar. 21, 1961

2,976,124

FLUID INDICATOR

Albert Wittlin, % Allin Mfg. Co., 410 N. Hermitage Ave., Chicago 22, Ill.

Filed June 2, 1958, Ser. No. 739,176

5 Claims. (Cl. 23—253)

This invention relates to a fluid indicator and in particular to an indicator adapted to be inserted in a fluid line to permit determination of conditions of the fluid, including determination of the moisture condition thereof.

In certain recirculating fluid systems, such as refrigeration systems, it is desirable to effect substantial elimination of certain undesirable substances such as water. To service such systems properly, it is desirable to provide some means for determining the quantity of such substances in the refrigerant fluid and to indicate when they have been effectively removed.

The principal feature of the instant invention is the provision of a new and improved fluid indicator for indicating a variation in a fluid of a quantity of another substance.

Another feature is the provision of such a fluid indicator having simple and economical means for indicating the variation in the quantity of the other substance.

A further feature is that the indicating means is arranged in a novel manner to have substantially no flow restriction effect on the flow passage in which it is installed.

Still another feature is the provision of such a fluid indicator having new and improved standard reference means with which the variable appearance of the indicator means may be compared.

A still further feature of the invention is the provision of such a fluid indicator providing improved viewing of the indicating elements thereof.

Other features and advantages of the invention will be apparent from the following description, taken in connection with the accompanying drawing, wherein:

Fig. 1 is an elevation of a fluid indicator embodying the invention;

Fig. 2 is an enlarged fragmentary section taken approximately along the line 2—2 of Fig. 1;

Fig. 3 is a transverse section taken approximately along the line 3—3 of Fig. 2; and Fig. 4 is an exploded view of the elements of the moisture indicator prior to the assembly thereof.

In the exemplary embodiment of the invention, as disclosed in the drawing, a liquid indicator comprises a tubular protective member 10 having a transparent tube 11 sealingly secured in member 10 by suitable gaskets 12 to define a fluid flow passage 13. The tubular member is provided with a pair of opposed ports 14 and 15 which are aligned with transparent tube 11 to permit the ready viewing of fluid within the tube.

Disposed in tube 11 so as to be viewable through ports 14 and 15 is a means 16 providing a variable appearance as a function of the presence of another substance in the fluid flowing through passage 13. In illustrating the invention, we will assume that the flow indicator is inserted in a refrigerating system and that means 16 is responsive to the presence of moisture in the refrigerant fluid. As best seen in Fig. 4, indicating means 16 comprises a sheet or strip 17 provided with a body of material having a color varying as a function of the presence of moisture in the refrigerant. Different types of such materials suitable for this purpose are well-known in the art. In the illustrated embodiment, strip 17 is formed of paper impregnated with a cobalt salt such as cobaltous chloride.

Strip 17 is carried by a support 18 formed of a flexible material such as aluminum. Between strip 17 and support 18 is disposed a flat spring 19 formed of a suitable springy material such as spring steel. Each of strip 17, support 18 and spring 19 comprises a thin, elongated element having a length slightly smaller than the internal circumference of tube 11. The longitudinal edges of support 18 are irregular, defining a plurality of opposed triangular portions 20 and 21. Triangular portions 20 preferably are aligned with triangular portions 21 transversely of the support and are spaced therefrom by a support mid-portion 22 which is similar in area to spring 19 and strip 17.

Indicating means 16 is assembled by facially juxtaposing flat spring 19 to support mid-portion 22 and facially juxtaposing strip 17 to the exposed face of flat spring 19. Triangular portions 20 and 21 are then folded around the longitudinal edges of the juxtaposed spring and strip to overlie the strip. The resultant overturned arrangement of the support triangular portions, as best seen in Fig. 2, effectively maintains the elements of the indicating means 16 in proper asembled relationship.

In placing the indicating means 16 within tube 11, the indicating means is flexed to a cylindrical disposition with the overturned triangular portions 20 and 21 outermost, and moved into the center of the tube 11 through one end thereof. Spring 19 causes the indicating means to bias itself radially outwardly against the inner surface of tube 11 and, thus, causes the indicating means to have a secure frictional engagement with the tube, locking the indicating means in place in registration with ports 14 and 15 of the tubular member. As each of strip 17, spring 19 and support 18 comprises a thin element, the radial thickness of indicating means 16 is relatively small, resulting in substantial elimination of resistance to fluid flow through the tube 11.

To improve the functioning of indicating means 16 and assure a substantial immediate indication of a change in the moisture content of the refrigerant fluid, indicating means 16 is arranged in a novel manner to permit a small amount of the refrigerant fluid to pass between strip 17 and the inner surface of tube 11. This is effected by maintaining longitudinal spacing between each of the overturned triangular portions 20 on one longitudinal edge of the support and a longitudinal spacing of each of overturned triangular portions 21 on the other longitudinal edge so that a flow of the refrigerant fluid may be had through the resultant passages 23 transversely across the face of strip 17. However, as the thickness of passages 23 is only the thickness of the triangular portions 20 and 21, the strip is closely juxtaposed to the inner surface of tube 11 while yet sufficient fluid may flow thereover to maintain the surface of the strip clean and assure an immediate response to changes in the moisture content of the fluid system.

Another desirable feature mebodied in the indicating means 16 is the provision of improved means for determining the variation of the color of the strip material from a standard color in determining the variation of the moisture content from a predetermined standard. More specifically, the invention comprehends the placement of a standard color reference within the tube 11 where it may most accurately be compared with the color of strip 17. In the illustrated embodiment, this is accomplished by causing the surfaces of triangular portions 20 and 21 viewable through ports 14 and 15 to have a color corresponding to the color of indicating means strip 17 when the fluid in passage 13 is completely dry. Such coloring of the triangular portions may be effected by applying a suitable coating to the support as by painting or may be obtained by properly anodizing the aluminum support. It is desirable to simulate the texture of the strip 17, as well as the color, further improving the accuracy with which the color comparison may be made.

Another feature of indicating means 16 is that the indicator presents a substantial viewing area for improved observation, while yet it permits conventional flow condition observations of the fluid in passage 13 as it extends laterally only a small portion of the longitudinal extent of tube 11 viewable through the ports.

In certain installations, it is desirable to determine the fluid conditions by observation thereof other than through a single front port. By virtue of its substantial 360° extent along the inner circumference of tube 11, observation of indicating means 16 may be made through other suitable ports, such as port 15, spaced from the first port 14 an angular distance as measured in a plane drawn perpendicularly to the longitudinal extent of tube 11. (In the illustrated embodiment, this angular distance would be 180°, as port 15 is diametrically opposed to port 14.)

While I have shown and described certain embodiments of my invention, it is to be understood that it is capable of many modifications. Changes, therefore, in the construction and arrangement may be made without departing from the spirit and scope of the invention as defined in the appended claims.

I claim:

1. In a fluid indicator having a flow passage having interior walls, said passage being bounded at one portion by transparent means permitting the viewing of the interior thereof, means in said passage for indicating the presence of another substance in the fluid, comprising: a sheet of material having an appearance varying as a function of the presence of matter substance in the fluid, said sheet being bound on one side by a resilient support, said sheet and said support being adapted to be biased against the interior walls of said passage.

2. In a fluid indicator having a flow passage having interior walls, said passage being bounded at one portion by transparent means permitting the viewing of the interior thereof, means in said passage for indicating the presence of another substance in the fluid, comprising: a sheet of material having an appearance varying as a function of the presence of another substance in the fluid, said sheet comprising an elongated strip being bound on one side by a spring and a support, said sheet, spring and support being adapted to be biased against the interior walls of said passage.

3. The device of claim 2 wherein the edges of said support are inturned to overlie said strips.

4. The device of claim 3 wherein said support edges are triangular and provide as a standard reference a fixed appearance with which the variable appearance of said sheet may be compared.

5. In a fluid indicator provided with a passage for the flow of a fluid therethrough, said passage being bounded at one portion by transparent means permitting the viewing of the passage, means in the passage for indicating the presence of another substance in the fluid, comprising: a body of material having an appearance varying as a function of the presence of another substance in the fluid; means urging said body toward said transparent means; and means spacing the surface of the body of material which confronts the transparent means a small distance from the transparent means and defining with said confronting surface and the transparent means at least one thin flow passage therebetween extending generally in the direction of flow of the fluid through the indicator and permitting a flow against said surface of a portion of the fluid flowing through the indicator passage.

References Cited in the file of this patent

UNITED STATES PATENTS

| | | |
|---|---|---|
| 1,103,985 | Murray | July 21, 1914 |
| 2,159,355 | Goetze | May 23, 1939 |
| 2,600,148 | Wittlin | June 10, 1952 |
| 2,624,308 | Wittlin | Jan. 6, 1953 |
| 2,725,844 | Wittlin | Dec. 6, 1955 |
| 2,744,488 | Wittlin | May 8, 1956 |
| 2,757,632 | Wittlin | Aug. 7, 1956 |
| 2,844,026 | Wischmeyer | July 22, 1958 |

FOREIGN PATENTS

| | | |
|---|---|---|
| 324,326 | Great Britain | Jan. 20, 1930 |
| 830,250 | Germany | July 8, 1949 |